US012641522B2

(12) United States Patent
Eleftheriadis et al.

(10) Patent No.: US 12,641,522 B2
(45) Date of Patent: May 26, 2026

(54) DETERMINING WHETHER WIRELESS DEVICES MEET A LOCATION CRITERION

(71) Applicant: Telefonaktiebolaget LM Ericsson (publ), Stockholm (SE)

(72) Inventors: Lackis Eleftheriadis, Valbo (SE);
Ioannis Fikouras, Stockholm (SE);
Athanasios Karapantelakis, Solna
(SE); Marios Daoutis, Bromma (SE);
Maxim Teslenko, Sollentuna (SE);
Akis Laftsidis, Sundbyberg (SE);
Alexandros Nikou, Danderyd (SE);
Konstantinos Vandikas, Solna (SE)

(73) Assignee: Telefonaktiebolaget LM Ericsson (publ), Stockholm (SE)

( * ) Notice: Subject to any disclaimer, the term of this
patent is extended or adjusted under 35
U.S.C. 154(b) by 321 days.

(21) Appl. No.: 18/258,004

(22) PCT Filed: Dec. 16, 2020

(86) PCT No.: PCT/EP2020/086587
§ 371 (c)(1),
(2) Date: Jun. 16, 2023

(87) PCT Pub. No.: WO2022/128090
PCT Pub. Date: Jun. 23, 2022

(65) Prior Publication Data
US 2024/0098623 A1     Mar. 21, 2024

(51) Int. Cl.
H04W 4/00          (2018.01)
G01S 5/00          (2006.01)
(Continued)

(52) U.S. Cl.
CPC ........... H04W 48/08 (2013.01); G01S 5/0036
(2013.01); G01S 5/0284 (2013.01); H04W
64/006 (2013.01)

(58) Field of Classification Search
CPC ... H04W 48/08; H04W 64/006; H04W 24/10;
H04W 76/14
See application file for complete search history.

(56) References Cited

U.S. PATENT DOCUMENTS

2011/0243010 A1    10/2011  Geirhofer et al.
2021/0028832 A1*    1/2021  Liu ...................... H04B 7/0617

FOREIGN PATENT DOCUMENTS

EP          2848017 B1 *   6/2018    ............ H04W 72/27
WO      2015027879 A1      3/2015
WO      2017187713 A1     11/2017

OTHER PUBLICATIONS

Rastorgueva-Foi, Elizaveta, et al., "User Positioning in mmW 5G
Networks Using Beam-RSRP Measurements and Kalman Filter-
ing", 21st International Conference on Information Fusion, Sep. 5,
2018, 1-2.

(Continued)

*Primary Examiner* — Omoniyi Obayanju
(74) *Attorney, Agent, or Firm* — Murphy, Bilak &
Homiller, PLLC

(57)          ABSTRACT

A method performed by a control node (800) for determin-
ing whether two wireless devices meet a location criterion
for closeness, the method comprising: obtaining (701), from
the two wireless devices, measurements of a reference signal
transmitted in a beam by a radio network node to a plurality
of measurement points that are spatially distributed around
the two wireless devices; and determining (702) whether the
two wireless devices meet the location criterion based on the
obtained measurements.

20 Claims, 9 Drawing Sheets

(51) Int. Cl.
    *G01S 5/02*         (2010.01)
    *H04W 48/08*     (2009.01)
    *H04W 64/00*     (2009.01)

(56)             References Cited

OTHER PUBLICATIONS

Sellami, Amal , et al., "Multi-Stage Localization for Massive MIMO 5G Systems", IEEE, Cosim Research Lab., Higher School of Communications (SUP'COM), University of Carthage, Tunisia, 2020, 1-6.

\* cited by examiner

Fig. 1

Obtaining, from two wireless devices, measurements of a reference signal transmitted in a beam by a radio network node to a plurality of measurement points that are spatially distributed around the two wireless devices — 701

Determining whether the two wireless devices meet a location criterion based on the obtained measurements — 702

DETERMINING WHETHER WIRELESS DEVICES MEET A LOCATION CRITERION

TECHNICAL FIELD

This disclosure relates to a method and apparatus for determining whether two wireless devices meet a location criterion for closeness.

BACKGROUND

There are many use cases in the wireless technology field that require wireless devices (WD) (e.g. user equipments (UEs)), to be close to each other. An example of such a use case is peer-to-peer (P2P) communication, where wireless devices can communicate directly with each other without the communications passing through a radio network node such as a base station or access point. One example of P2P communication is device to device (D2D) communication in cellular communication networks. As used herein, when wireless devices are sufficiently close to each other to perform D2D communication, they can be said to be 'co-located' (although it will be appreciated that the wireless devices do not have to be at exactly the same position to be considered co-located).

In current state of art, detection of co-located wireless devices is achieved using either satellite-based positioning systems (e.g. Global Positioning System, GPS) or D2D discovery mechanisms. The latter case includes several technologies such as Bluetooth, WiFi Direct and Long Term Evolution (LTE)/$5^{th}$ Generation (5G) D2D, where D2D can be implemented using Proximity Services protocols, also known as ProSe.

There exist two alternatives for device discovery. Firstly a UE-initiated discovery, wherein a UE initiates discovery by transmitting a beacon that can be received by other devices in proximity of the UE. Another approach uses mobile network nodes (e.g. radio base stations) for coordination, in what is called "network assisted" discovery for D2D communications. During network-assisted discovery, the network realises that two or more D2D-enabled devices are in proximity and initiates D2D session establishment.

A large number of devices such as sensors, wearables, certain types of mobile phones and computers, etc., do not have the capability to use satellite-based positioning systems, or using such systems regularly is undesirable in view of the amount of energy consumed. Furthermore, UE-initiated D2D discovery consumes energy on the UE side as the UE transmits discovery beacons without coordination as a random procedure. Therefore, network-assisted discovery is one of the most promising techniques for D2D communication. However, current approaches are limited in the way the radio base station detects proximity or closeness of two wireless devices. These approaches are primarily based on extracting reference metrics such as Signal-to-Interference-plus-Noise Ratio (SINR), path gain and interference. These current methods may lead to false positives in estimating proximity between UEs. In addition, current methods consider multiple beams pointed to a UE or UEs in order to identify proximity, potentially exhausting available beams in the antenna.

Therefore there is a need for improved techniques for determining whether wireless devices are sufficiently close for P2P communication and other applications.

SUMMARY

Certain aspects of the present disclosure and their embodiments may provide solutions to the above or other challenges. A technique is proposed to enhance performance of existing network-assisted discovery techniques using beamforming. The technique can be applied after an initial classification of UE groups (a group being a collection of UEs in proximity of each other), for example using standard reference signals. In the method a beam is directed around the UE group and measurements by the UEs analysed to verify true positives or false negatives (i.e. UEs that are actually in proximity of each other or not).

According to a first aspect, there is provided a method performed by a control node for determining whether two wireless devices meet a location criterion for closeness. The method comprises: (i) obtaining, from the two wireless devices, measurements of a reference signal transmitted in a beam by a radio network node to a plurality of measurement points that are spatially distributed around the two wireless devices; and (ii) determining whether the two wireless devices meet the location criterion based on the obtained measurements.

According to a second aspect, there is provided a computer program comprising computer readable code being configured such that, on execution by a suitable computer or processor, the computer or processor is caused to perform the method according to the first aspect.

According to a third aspect, there is provided a computer readable medium comprising the computer program of the second aspect embodied therein.

According to a fourth aspect, there is provided a computer program product comprising the computer readable medium of the third aspect.

According to a fifth aspect, there is provided a control node for determining whether two wireless devices meet a location criterion for closeness. The control node is configured to: (i) obtain, from the two wireless devices, measurements of a reference signal transmitted in a beam by a radio network node to a plurality of measurement points that are spatially distributed around the two wireless devices; and (ii) determine whether the two wireless devices meet the location criterion based on the obtained measurements.

According to a sixth aspect, there is provided a control node for determining whether two wireless devices meet a location criterion for closeness. The control node comprising a processor and a memory, said memory containing instructions executable by said processor whereby said control node is operative to: (i) obtain, from the two wireless devices, measurements of a reference signal transmitted in a beam by a radio network node to a plurality of measurement points that are spatially distributed around the two wireless devices; and (ii) determine whether the two wireless devices meet the location criterion based on the obtained measurements.

The techniques disclosed herein enhance performance of existing techniques for detecting co-located UEs and can, in some embodiments, be used for initiating more reliable D2D sessions, as current approaches only take into account measurements from a single point of reference to identify UE position (potentially by using several beams). Instead, the disclosed method takes measurements from multiple points of reference. In some embodiments, the measurements may be obtained using a single beam. Only one beam can be used versus multiple used in the state of art, thus conserving resources on the antenna of the radio base station. The measurements are used to determine whether two or more wireless devices meet a location criterion for closeness i.e. are co-located, or are otherwise sufficiently close to each other to perform P2P communication. The location criterion relates to the relative positions of the wireless devices. The techniques disclosed herein are therefore concerned with determining the relative position of the wireless devices, rather than needing to measure their absolute positions.

Other aspects and embodiments of the techniques described herein will be understood by those skilled in the art based on the description below and the accompanying drawings.

BRIEF DESCRIPTION OF THE DRAWINGS

Some of the embodiments contemplated herein will now be described more fully with reference to the accompanying drawings, in which:

FIG. 1 is a wireless network in accordance with some embodiments;

DETAILED DESCRIPTION

Figure 2:
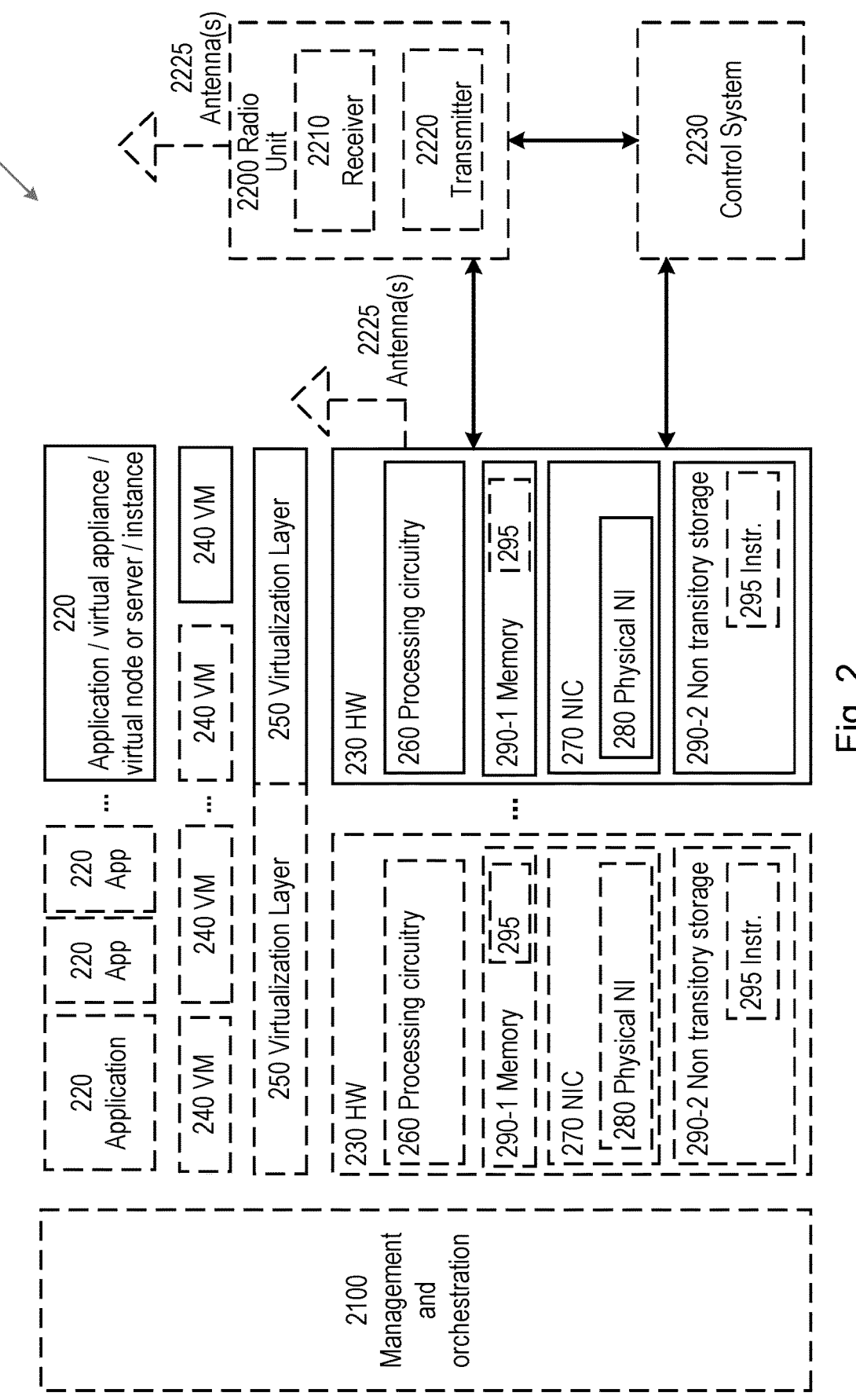
FIG. 2 is a virtualisation environment in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted above, the techniques described herein improve existing network-assisted discovery techniques by using beamforming. The techniques are used to determine whether two wireless devices meet a location criterion for closeness. In some embodiments, the techniques can be implemented by a control node. The control node can be part of a radio network node, such as a base station in a telecommunication network or a WiFi access point (AP) in a wireless local area network (WLAN), part of a core network of a telecommunication network, or separate from the network in which the wireless devices are in use. In the former case, the control node can, for example, be part of baseband circuitry in the radio network node or part of an antenna controller in the radio network node. In embodiments where the control node is part of the core network, the control node can be part of an Operations Support System (OSS) node, or other core network node.

In this description, wireless devices that are determined to meet a location criterion for closeness are also referred to as 'co-located', or 'in proximity with each other'. However, it should be understood that 'co-located' is not intended to mean that the wireless devices share exactly the same position, and the permissible distance between 'co-located' wireless devices can depend on the purpose for evaluating the location criterion. For example, in some embodiments meeting a location criterion for closeness can indicate that wireless devices are close enough for P2P communication. In other embodiments, it can indicate that the wireless devices are in the same building, room or vehicle. In the case of P2P communication, it will also be appreciated that the permissible distance between the wireless devices can depend on the communication technology to be used to establish the P2P communication. For example, if Bluetooth is to be used for the P2P communication, the wireless devices need to be closer together for the location criterion to be satisfied than if the wireless devices are to use a cellular technology such as WiFi or LTE/5G.

Figure 1:
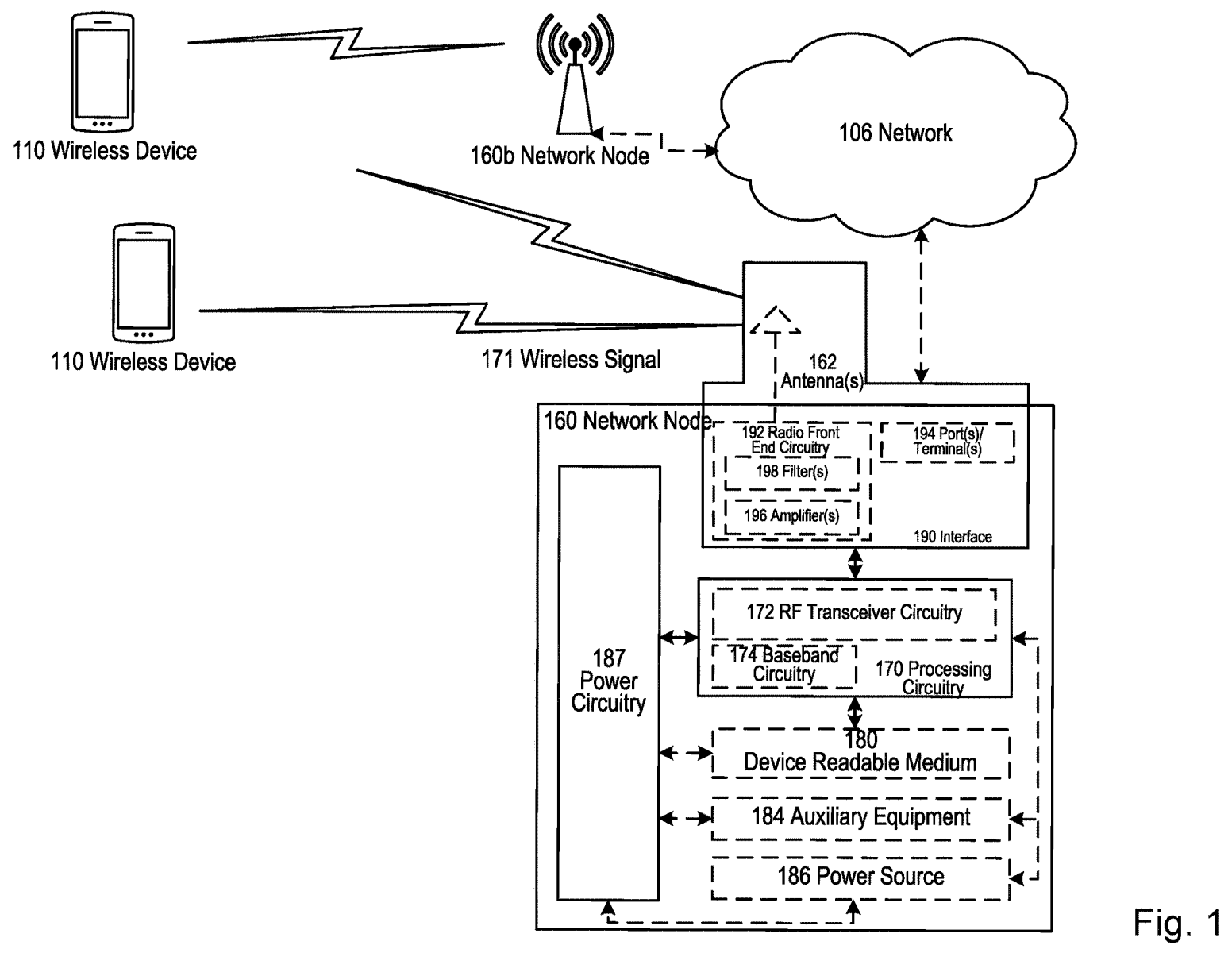

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, radio network nodes 160 and 160*b*, and WDs 110. In practice, a wireless network may further include any additional elements suitable to support communication between wireless devices or between a wireless device and another communication device, such as a landline telephone, a service provider, or any other network node or end device. Of the illustrated components, radio network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, radio network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of radio network nodes include, but are not limited to, access points (APs) (e.g., radio access points), base stations (BSs) (e.g., radio base stations, Node Bs, evolved Node Bs (eNBs) and NR NodeBs (gNBs)). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a Radio Network Controller (RNC) component, or a Base Transceiver Station (BTS) component and a Base Station Controller (BSC) component, etc.), which may each have their own respective components. Network node 160 may also include multiple sets of the various illustrated components for different wireless technologies integrated into network node 160, such as, for example, GSM, Wideband Code Division Multiple Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In some embodiments, the control node (also referred to as the Auditor) is part of the baseband circuitry 174. Although not shown in FIG. 1, in some embodiments the processing circuitry 170 can comprise an Antenna Controller embedded partially in the baseband circuitry 174 and partially in the RF transceiver circuitry 172.

In certain embodiments, some or all of the functionality described herein as being provided by a control node, a radio network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals 171. As described herein, wireless signals are transmitted by the radio network node 160 in beams in order to gather information on whether two wireless devices are co-located, and therefore antenna 162 is capable of transmitting wireless signals in beams. Those skilled in the art will be aware of beamforming techniques and the transmission of signals using beams, for example as used in 5G networks, and WiFi networks. Antenna 162 may be coupled to radio front end circuitry 190 and may be any type of antenna capable of transmitting and receiving data and/or signals wirelessly. In some instances, the use of more than one antenna may be referred to as multiple-input and multiple-output (MIMO). In some embodiments, the antenna 162 can be massive MIMO (mMIMO) antennas. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

FIG. 2 is a schematic block diagram illustrating a virtualization environment 200 in which functions implemented by some embodiments may be virtualized. In the present context, virtualizing means creating virtual versions of apparatuses or devices which may include virtualizing hardware platforms, storage devices and networking resources. As used herein, virtualization can be applied to a control node that implements the techniques described herein, a radio network node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 200 hosted by one or more of hardware nodes 230. Further, in embodiments in which the virtual node is not a radio access node or does not require radio connectivity (e.g., a core network node), then the network node may be entirely virtualized.

The functions may be implemented by one or more applications 220 (which may alternatively be called software instances, virtual appliances, network functions, virtual nodes, virtual network functions, etc.) operative to implement some of the features, functions, and/or benefits of some of the embodiments disclosed herein. Applications 220 are run in virtualization environment 200 which provides hardware 230 comprising processing circuitry 260 and memory 290. Memory 290 contains instructions 295 executable by processing circuitry 260 whereby application 220 is operative to provide one or more of the features, benefits, and/or functions disclosed herein.

Virtualization environment 200, comprises general-purpose or special-purpose network hardware devices 230 comprising a set of one or more processors or processing circuitry 260, which may be commercial off-the-shelf (COTS) processors, dedicated Application Specific Integrated Circuits (ASICs), or any other type of processing circuitry including digital or analog hardware components or special purpose processors. Each hardware device may comprise memory 290-1 which may be non-persistent memory for temporarily storing instructions 295 or software executed by processing circuitry 260. Each hardware device may comprise one or more network interface controllers (NICs) 270, also known as network interface cards, which include physical network interface 280. Each hardware device may also include non-transitory, persistent, machine-readable storage media 290-2 having stored therein software 295 and/or instructions executable by processing circuitry 260. Software 295 may include any type of software including software for instantiating one or more virtualization layers 250 (also referred to as hypervisors), software to execute virtual machines 240 as well as software allowing it to execute functions, features and/or benefits described in relation with some embodiments described herein.

Virtual machines 240, comprise virtual processing, virtual memory, virtual networking or interface and virtual storage, and may be run by a corresponding virtualization layer 250 or hypervisor. Different embodiments of the instance of virtual appliance 220 may be implemented on one or more of virtual machines 240, and the implementations may be made in different ways.

During operation, processing circuitry 260 executes software 295 to instantiate the hypervisor or virtualization layer 250, which may sometimes be referred to as a virtual machine monitor (VMM). Virtualization layer 250 may present a virtual operating platform that appears like networking hardware to virtual machine 240.

As shown in FIG. 2, hardware 230 may be a standalone network node with generic or specific components. Hardware 230 may comprise antenna 2225 and may implement some functions via virtualization. Alternatively, hardware 230 may be part of a larger cluster of hardware (e.g. such as in a data center or customer premise equipment (CPE)) where many hardware nodes work together and are managed via management and orchestration (MANO) 2100, which, among others, oversees lifecycle management of applications 220.

Virtualization of the hardware is in some contexts referred to as network function virtualization (NFV). NFV may be used to consolidate many network equipment types onto industry standard high volume server hardware, physical switches, and physical storage, which can be located in data centres, and customer premise equipment. In the context of NFV, virtual machine 240 may be a software implementation of a physical machine that runs programs as if they were executing on a physical, non-virtualized machine. Each of virtual machines 240, and that part of hardware 230 that executes that virtual machine, be it hardware dedicated to that virtual machine and/or hardware shared by that virtual machine with others of the virtual machines 240, forms a separate virtual network elements (VNE).

Still in the context of NFV, Virtual Network Function (VNF) is responsible for handling specific network functions that run in one or more virtual machines 240 on top of hardware networking infrastructure 230 and corresponds to application 220 in FIG. 2.

In some embodiments, one or more radio units 2200 that each include one or more transmitters 2220 and one or more receivers 2210 may be coupled to one or more antennas 2225. Radio units 2200 may communicate directly with hardware nodes 230 via one or more appropriate network interfaces and may be used in combination with the virtual components to provide a virtual node with radio capabilities, such as a radio access node or a base station.

In some embodiments, some signalling can be effected with the use of control system 2230 which may alternatively be used for communication between the hardware nodes 230 and radio units 2200.

Figure 3:
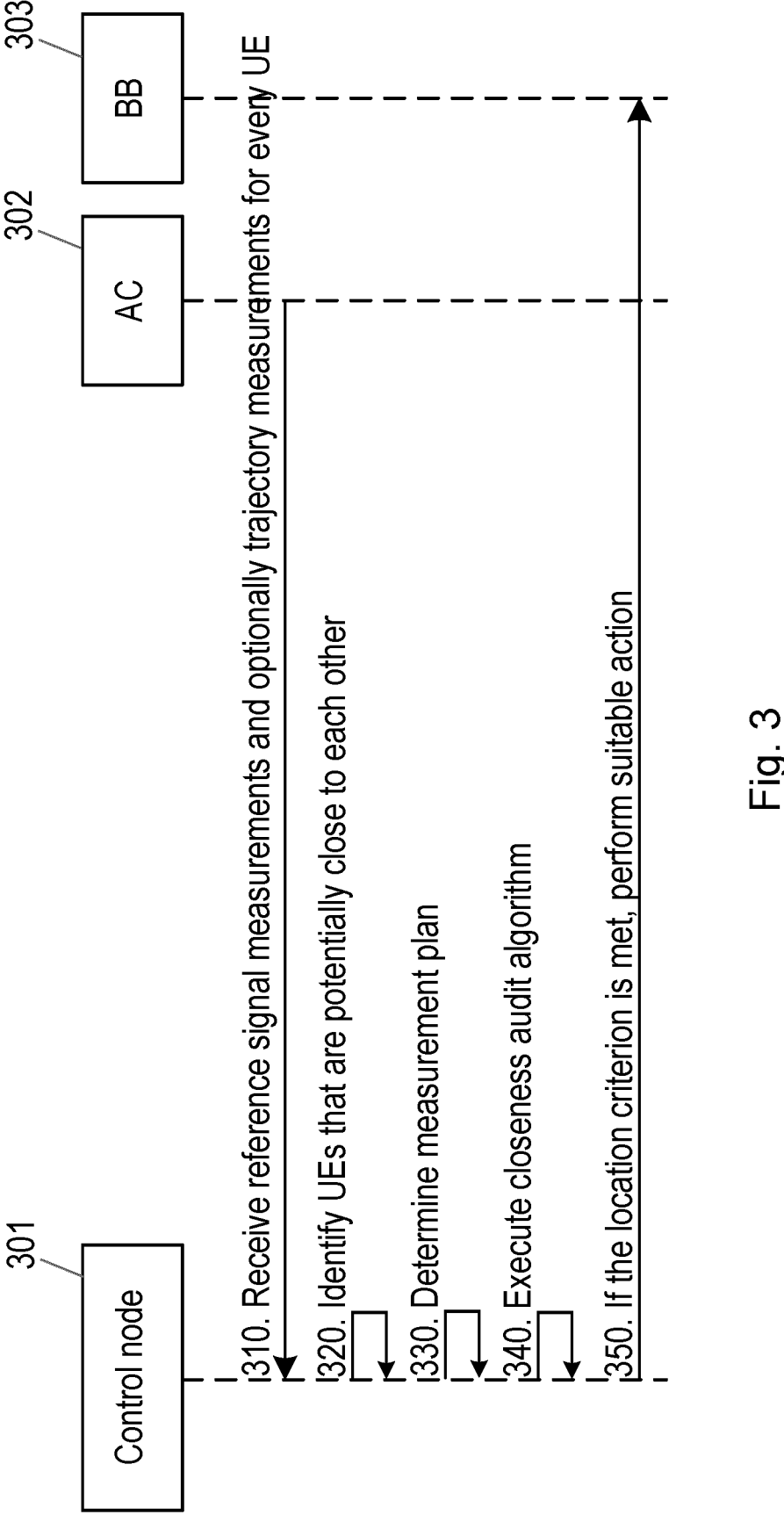
FIG. 3 is a signalling diagram illustrating embodiments of the techniques described herein.

FIG. 3 is a signalling diagram illustrating some embodiments of the method described herein for determining whether a plurality of UEs meet a location criterion for closeness. In this illustrated embodiment the location criterion for closeness is used to determine which UEs are co-located in order for a D2D session (or other P2P session) to be initiated between them, but it will be appreciated that the illustrated technique can be used for other purposes.

FIG. 3 shows an embodiment where the techniques are implemented by a control node 301 that is separate from an Antenna Controller (AC) 302 and Baseband circuitry/unit (BB) 303 in a radio network node. The control node 301 may be part of the radio network node, or separate from the radio network node. As noted above, in some embodiments the control node 301 can be part of the AC 302 or the BB 303.

Briefly the techniques apply an approach that uses measurements of reference signals to identify wireless devices (e.g. UEs) that might be close to each other. False positives are then reduced or eliminated by executing a pattern of reference signal measurements in different points around the UEs using a reference signal transmitted in a beam. A reference signal transmitted in a beam is herein referred to as a "beamformed reference signal".

In a first step, step 310, the control node 301 receives reference signal measurements for UEs attached to (e.g. served by) the radio network node. The reference signal measurements are measurements by the UEs of reference signals transmitted by the radio network node. The reference signals are transmitted by the radio network node using beamforming, so the reference signals are transmitted in beams towards specific UE(s). The UEs report these measurements to the radio network node, for example in Radio Resource Control (RRC) measurement reports, and the antenna controller 302 sends these measurements to the control node 301 in step 310. The reference signal measurements can be any suitable type of measurement, such as Reference Signal Received Power (RSRP) measurements, Reference Signal Received Quality (RSRQ) measurements, or Received Signal Strength Indicator (RSSI) measurements. The reference signal measurements may be obtained and reported by the UEs to the radio network node periodically, or in response to a request sent to the UEs. In addition, the AC 302 can optionally provide information about the trajectory of the UEs to the control node 301 in step 310. The information about the trajectory of the UEs can indicate a direction, speed and/or velocity of movement of each UE.

In the illustrated embodiment the control node 301 uses the received measurements to determine a first estimate of which of the UEs could meet the location criterion for closeness in step 320. In this step the UEs are clustered into groups based on an estimated geographical distance from each other, in such a way that co-located or approximately co-located UEs belong to the same group. To achieve this clustering, two criteria may be applied. The first is based on the reference signal measurements (e.g. RSRP) for the UEs. The second is based on the direction of the beam containing the reference signals towards a UE. This information about the beam direction can be received from a Beamforming Information Manager (BIM)—which has a table of beamforming values used to form appropriate beams—and resides in the radio network node. These two criteria can be used in exclusion (either) or in conjunction (both of them together), and are discussed further in relation to FIG. 4. Several approaches exist for both estimating UE position and trajectory using beam and reference signal measurements, for example as described in "User Positioning in mmW 5G Networks Using Beam-RSRP Measurements and Kalman Filtering" by E. Rastorgueva-Foi et al., 2018 21$^{st}$ International Conference on Information Fusion (FUSION), Cambridge, 2018, pp. 1-7, and "Multi-Stage Localization for Massive M IMO 5G Systems" by A. Sellami et al., 2020 IEEE 91$^{st}$ Vehicular Technology Conference (VTC2020-Spring), Antwerp, Belgium, 2020, pp. 1-6. The aim of the subsequent steps is to eliminate false positives in the first estimate by executing a pattern of reference signal measurements at different points around the UEs using beamformed reference signals.

Figure 4:
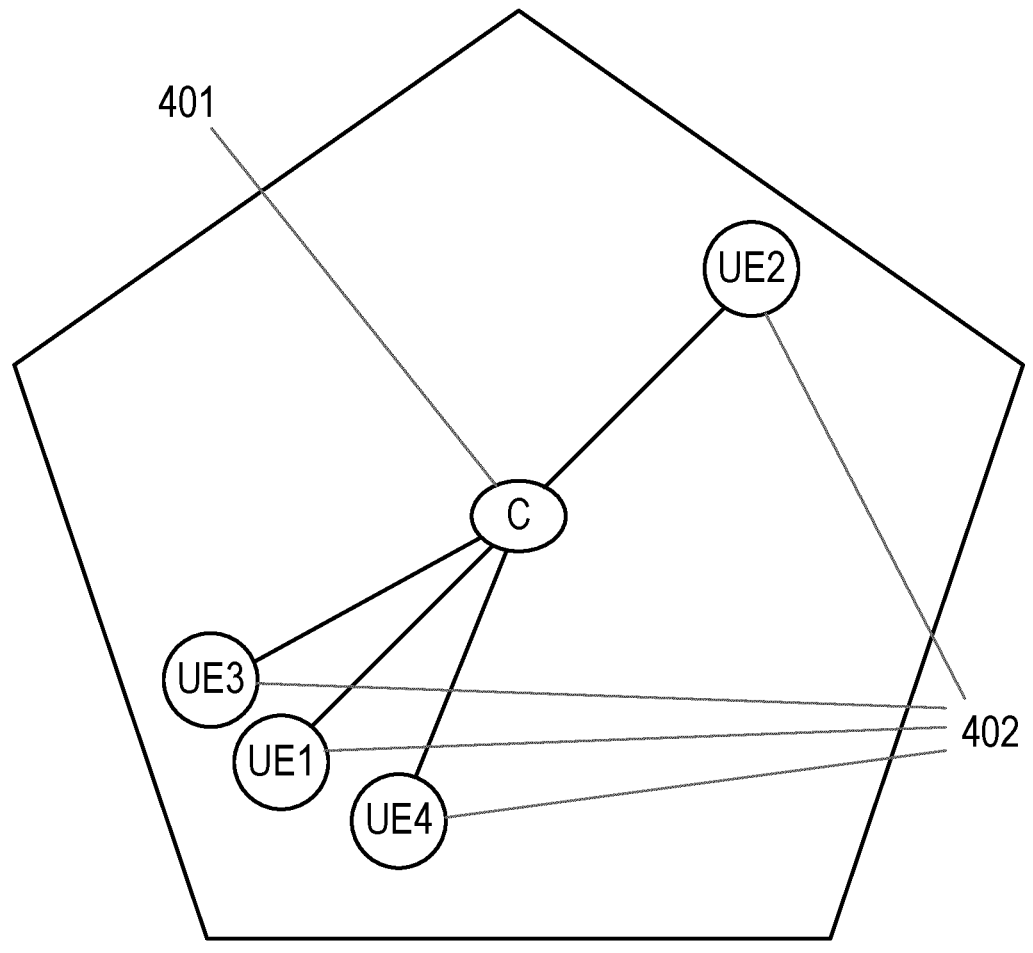
FIG. 4 is an illustration of the identification of wireless devices based on beam direction and reference signal measurements in accordance with some embodiments.

FIG. 4 illustrates an example in which both of the aforementioned criteria are used in determining a first estimate of co-location of UEs. A radio network node "C" 401 has four attached UEs 402: UE1, UE2, UE3 and UE4. Respective reference signal beams are transmitted by radio network node C 401 to the UEs 402. UE1, UE3 and UE2 have reported the same reference signal measurement values, even though UE2 is in a different direction from the radio network node 401 to the other two UEs 402. At the same time UE4 reports a different reference signal measurement even though it is in the same direction from the radio network node 401 as UE1 and UE3. This could be, for example, because UE4 is in a different elevation to the other two (e.g. a car passing on a bridge on top of another car passing below, or people in different floors of a building). Therefore, reference signal measurement similarity will yield set {UE1, UE3, UE2} as being potentially co-located and beam direction similarity will yield {UE1, UE3, UE4} as being potentially co-located. Where both criteria are applied, a first estimate of UEs that could meet the location criterion for closeness is provided by the intersection of these two sets, namely set {UE1, UE3}.

In the example of FIG. 4, the reference signal beams transmitted to the UEs 402 are as used in 5G radio (e.g. following current NR standards). In some embodiments, when a radio network node 401 is transmitting beams for the purpose of identifying UEs that might be close to each other, the preamble of the transmission is composed of 4-6 beams by default, until selection is made for the best beam for a UE 402 using reference signal measurements.

Although FIG. 3 indicates that the control node 301 can perform step 320, in alternative embodiments the antenna controller 302 can perform step 320 prior to step 310 and send information about the first estimate of which UEs could meet the location criterion for closeness to the control node 301 along with the reference signal measurements in step 310.

The UEs in the group identified in step 320 can be classified into sets of pairs in such a way that every pair has one UE overlapping with at least another pair in the group (e.g. A-B, A-C, D-B, etc.).

As noted above, a pattern of beamformed reference signals are to be directed to different points around potentially co-located UEs so that the UEs can measure these reference signals, with these measurements being used to reduce false positives found in step 320. Therefore, in a third step, step 330, for at least one pair of UEs in the group that might be co-located, the control node 301 determines a measurement plan comprising a pattern of reference signal beams spatially distributed around the pair of UEs. The control node 301 therefore creates a measurement plan for at least one pair of UEs. The measurement plan can be a set of <time, beam position> tuples which each specify a time and position of a beam. In some embodiments, a respective measurement plan can be determined for each pair of UEs.

Figure 5A:
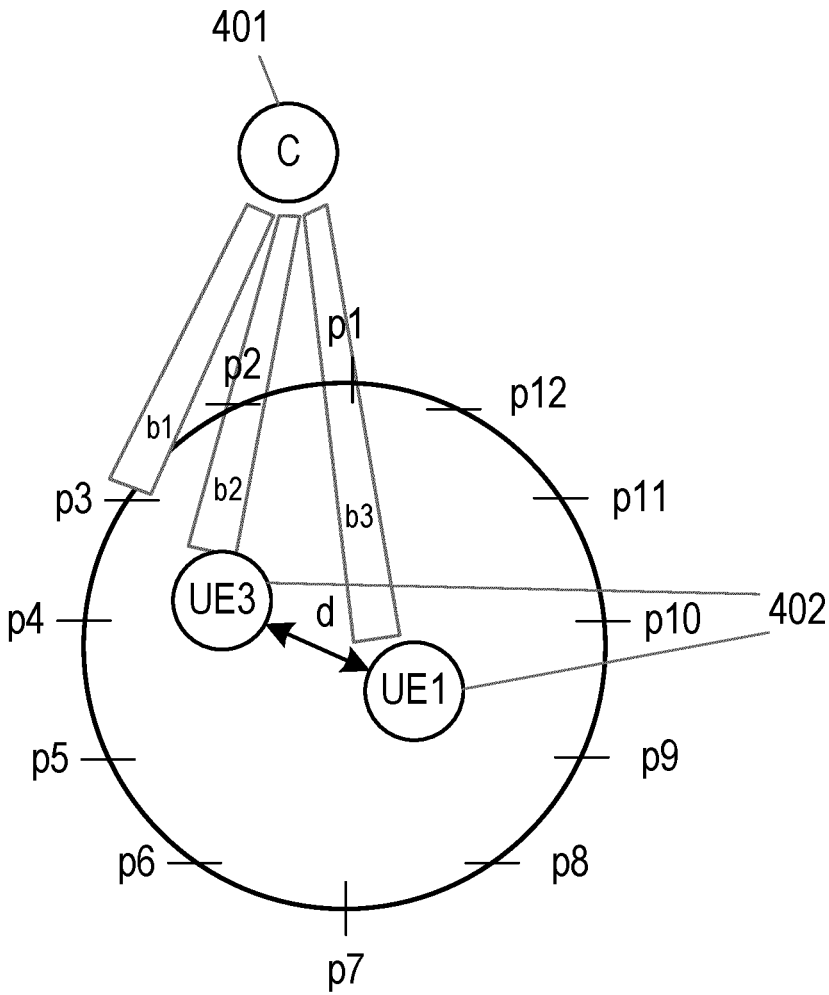
FIGS. 5(*a*) and (*b*) are illustrations of the transmission of a reference signal in a beam to a plurality of measurement points around two wireless devices in accordance with some embodiments.

FIG. 5(a) illustrates an example of a measurement plan for beamforming operations of radio network node C 401 around two potentially co-located UEs 402: UE1 and UE3 from the example in FIG. 4. These UEs are separated by an unknown distance d. A beam b1 is to be allocated by the radio network node 401 to the measurement process and beam b1 is to be directed around the UE pair in a generally circular pattern.

The measurement plan comprises a plurality of measurement points p1-p12 that are spatially distributed around the UEs 402. Each measurement point represents a point to which a beam is to be transmitted by the radio network node 401, with a measurement point corresponding to the direction of maximum gain of the beam's aperture. The beam is to be directed to each measurement point by changing properties of the "weight" of the beam (i.e. angle and azimuth properties).

In this example the plurality of measurement points p1-p12 form a generally circular pattern around a position associated with the positions of the UEs 402. This position can be an estimated midpoint between the UEs 402. The midpoint can be estimated based on approximate positions of the UEs. The approximate position of a given UE can be determined based on feedback received from the UE on reference signals (e.g. channel state information reference signals (CSI-RS)) sent out through Grid of Beams (GoB). More specifically, different beams in GoB are directed in different directions and transmit different reference signals (e.g. different CSI-RS). The UE reports which reference signal (CSI-RS signal) it can receive to the radio network node. From this report, an approximate position of the UE can be determined. In other embodiments, the position can be an estimated position of one of the UEs 402. The radius of the circular pattern formed by the measurement points can be of the order of a few metres, for example the radius of the circular pattern can be 1-5 metres. In some embodiments, the measurement plan can specify measurement points that define multiple concentric circular patterns having different radii, e.g. 1 m, 3 m, 5 m, etc.

It will be appreciated that the measurement points in the measurement plan can form any desired type of pattern, for example an oval, a spiral, a rectangle, a triangle, etc. around the UEs 402. In some embodiments, the pattern formed by the measurement points can comprise a plurality of lines and/or curves.

According to the measurement plan, the beam b1 is to be directed to points p1-p12 to enable the UEs 402 to take reference measurements. Although in the following it is assumed that the beam b1 is directed to points p1-p12 sequentially so that beam b1 is said to follow a circular trajectory, it will be appreciated that beam b1 could be directed to measurement points p1-p12 in any desired order.

In some embodiments, the beam selected for transmitting the reference signals depends on whether the UEs 402 in the group belong to a mission-critical service with Quality of Service (QoS) requirements such as teleoperation (remote operation) of machinery, e.g. vehicles or surgical equipment. If they do not, the UEs 402 can be considered to belong to a 'best effort' type of service.

FIG. 5(*a*) illustrates an embodiment in which an additional beam is allocated per UE pair in order to not interfere with the QoS of the current beams serving the UE. In the embodiment of FIG. 5(*a*), UE1 and UE3 have respective dedicated beams (labelled b3 and b2 respectively) that are used for user data traffic. Thus, a separate beam b1 is allocated for co-location auditing purposes and is referred to herein as the auditing beam. All reference signals are transported (transmitted) through this beam to the measurement points. The FIG. 5(*a*) approach can be used when the UEs 402 participate in a mission-critical scenario, e.g. have an ultra-reliable low latency communication (URLLC) network slice or similar.

FIG. 5(*b*) shows an alternative embodiment in which an existing beam serving the UE pair is used as the auditing beam and is therefore tasked with the local audit operation. Beam b1 is used for both data traffic and reference signal transmission for both UEs. This embodiment can be used in best effort type scenarios.

In the above explanation, it is assumed that the UEs 402 are not moving at any significant speed with respect to the time duration required to execute the measurement plan (i.e. during the course of executing the measurement plan the UEs 402 will not move any significant distance). However, in practice, one or both of the UEs 402 might be moving at a significant speed, for example if one or both of the UEs 402 are present in a vehicle. In this case, the measurement plan should take into account the movement of the UE(s) 402 during the execution of the measurement plan and adjust the position of the measurement points accordingly. Thus, if the UEs are moving, the measurement points p1-p12 in FIG. 5(*a*) will be shifted in distance depending on the future positions of the UEs 402 as predicted from the information about the trajectory of the UEs 402. The aim is for the position of the "p-points" in relation to the position of the UEs 402 to remain generally the same throughout the measurement process. Prediction of the future position of p-points can be done using the information about the trajectory of the UEs 402 received in step 310 (for example indicating a direction, speed and/or velocity of movement of each UE 402). Alternatively, or additionally, machine learning can be applied on a per-UE basis to utilize historical patterns of movement of a UE to predict its future position.

Figure 5B:
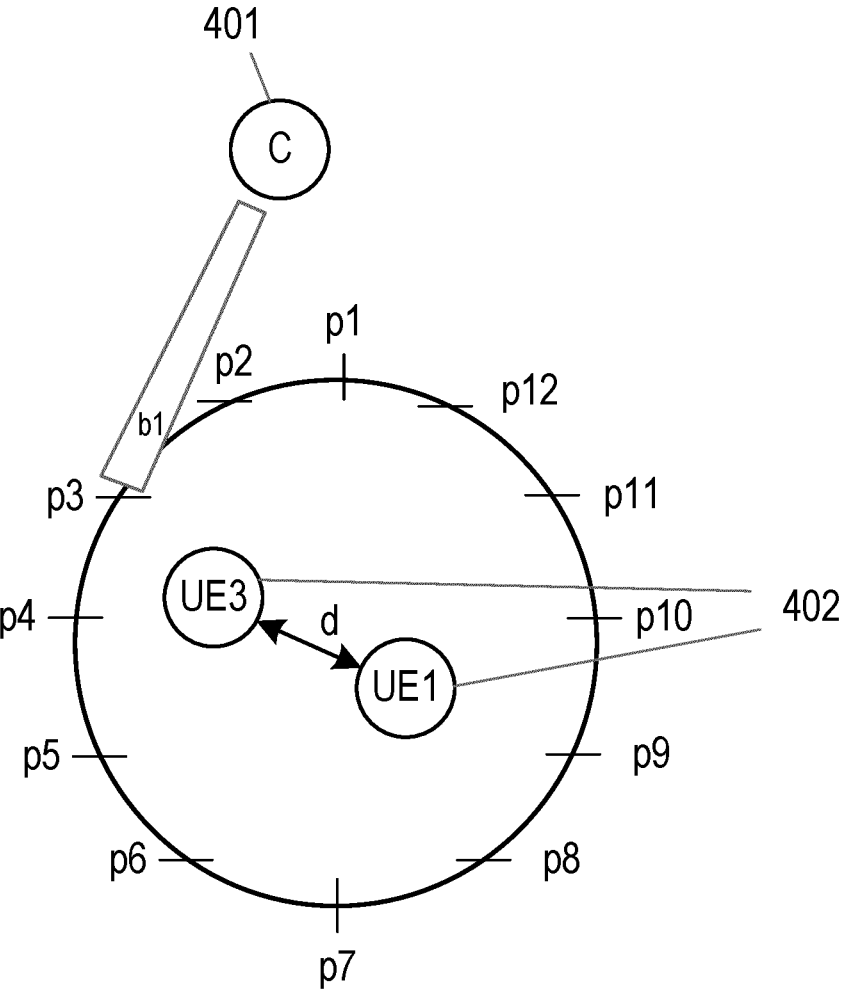
Figure 6:
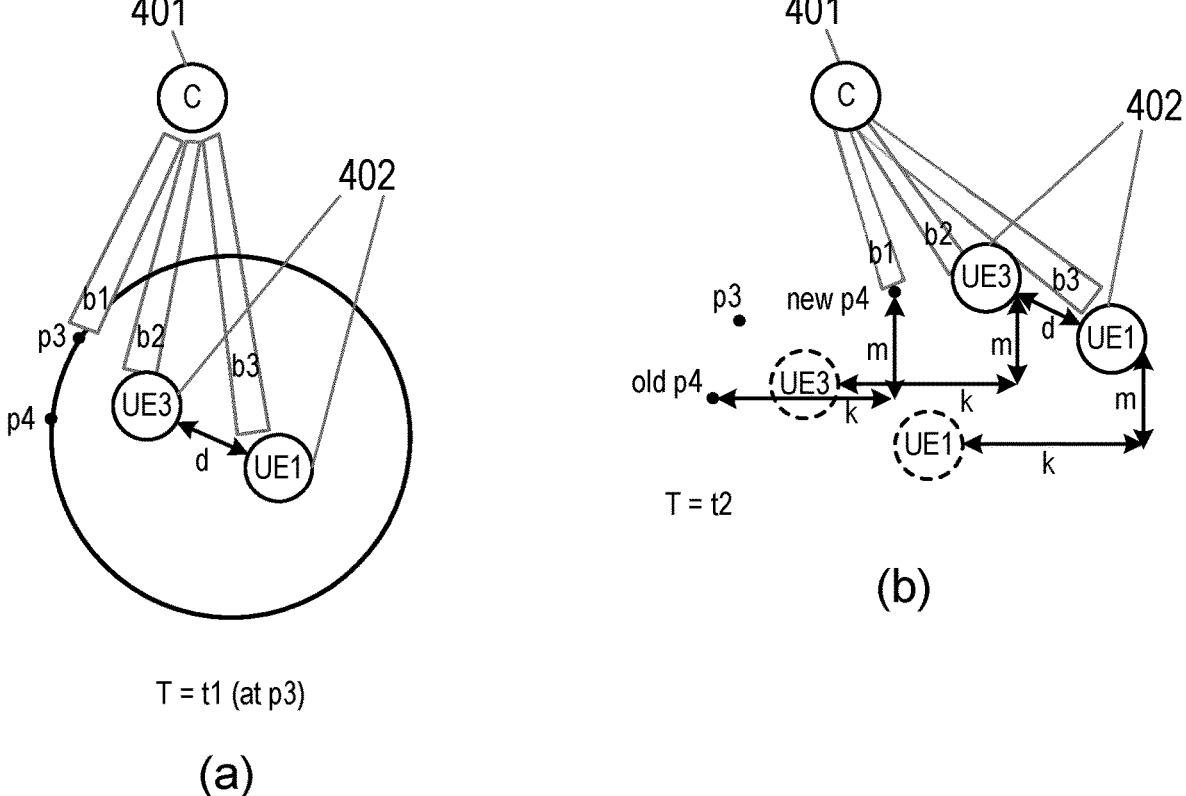
FIGS. 6(*a*) and (*b*) are illustrations of the transmission of a reference signal in a beam to a plurality of measurement points around two moving wireless devices in accordance with some embodiments.

FIG. 6 illustrates the adjustment of the position of measurement points based on the movement of the UEs 402. FIG. 6 relates to the embodiment in FIG. 5(*a*) in which respective dedicated beams are maintained for the user data traffic for UE1 and UE3, and a separate beam b1 is allocated for transmitting the reference signals. FIG. 6(*a*) shows UE1 and UE3 at a time $t_1$ when the beamformed reference signals are directed towards measurement point p3. The beamformed reference signal is to be directed to measurement point p4 at a time $t_2$, as shown in FIG. 6(*b*). However, the movement of the UEs 402 in the time interval $t_2-t_1$ leads to the position of the UEs 402 being a distance k along the x-axis and a distance m along the y-axis (in the plane of FIG. 6(*b*)) from the position of the UEs 402 at time $t_1$. Therefore, measurement point p4 is also shifted by a distance k along the x-axis and a distance m along the y-axis so that the position of p4 relative to the UEs 402 is the same as if the UEs 402 were not moving. In this way, a spatial distribution of the measurement points around the UEs 402 is maintained as they move.

In alternative embodiments, rather than determine the specific measurement points prior to the measurement process, the measurement points can be determined dynamically, which means that there is no need to predict future positions of UEs. Instead, following the example in FIG. 5(*a*), beams b2 and b3 will follow the UEs 402 as they move, and so beam b1 can be created only for the duration of the measurement at each measurement point. Positioning of beam b1 can be done based on a desired relative position of the measurement point with respect to the current position of focus of beams b2 or b3, given that the position of focus of these beams is the position of the UEs 402 (UE3 and UE1 respectively).

As noted above, multiple pairs of possibly closely spaced UEs may be identified in step 320, in which case step 330 can be performed for each pair of UEs to determine respective measurement plans setting out respective spatial distributions of measurement points.

Returning to FIG. 3, after determining the measurement plan in step 330, in a fourth step, step 340, the control node executes a closeness audit algorithm to determine if the pair of UEs meet the location criterion for closeness. In this closeness audit algorithm, the radio network node 401 transmits the reference signals in a series of beams towards each measurement point. Conventional beamforming techniques are used by the radio network node 401 to transmit a beam to a required measurement point. The beam is directed to the measurement points so that the UEs in the pair can take measurements of the reference signals. Thus, in the example shown in FIG. 5(*a*), UE1 and UE3 make respective measurements of the reference signal when the beam b1 is directed to each of the measurement points p1-p12. The measurements by the UEs 402 can be measurements of the strength of the signal and/or measurements of the quality of the signal. For example, the measurements can be measurements of RSRP, RSRQ and/or RSSI.

Due to environmental conditions, the strength and/or quality of the beamformed reference signal could be unstable between the different measurement points. The beamformed reference signal is therefore preferably moved discretely with a finite number of angular steps around the UEs 402 according to the required spatial distribution, rather than continuously. In the example of FIG. 5, the beam can be directed to a particular measurement point for some time at every point of the circle and then it is redirected to the next point and so on until the whole circle of measurement points is completed.

For each measurement point, the beam transmission power (i.e. the power with which the radio network node transmits the reference signals) can be adjusted. The beam transmission power can be adjusted to achieve a respectable signal strength and/or quality for the UEs 402. The reason for adjusting the transmission power is because the distance between a measurement point px and the UEs can be different to the distance between another measurement point py and the UEs. There could also be different obstacles and/or interference present for the different measurement points. Therefore, more transmission power can be needed in order to "reach" the UEs for those measurement points. This is especially (but not exclusively) useful for embodiments in which an existing beam is used as the auditing beam (e.g. as shown in FIG. 5(b)). In any case, transmission power adjustment is typically used in order for the UEs 402 to be able to keep the connection alive and transmit data.

In some embodiments, transmission power is adjusted automatically based on feedback from one or both of the UEs 402. The aim is to adjust transmission power to achieve a respectable level of signal strength and/or signal quality so that the UEs 402 continue experiencing a good QoS. That is, the UEs 402 can measure the strength and/or quality of the reference signal at a particular measurement point, report those measurements back to the radio network node, and the radio network node can adjust the transmission power of the beam to that measurement point based on the received measurements. Once the transmission power of the beam has been adjusted by the radio network node, the UEs 402 measure the strength and/or quality of the reference signal transmitted in the power-adjusted beam at that measurement point.

The transmission power adjustment is useful because the different measurement points are at different distances from the UEs (i.e. are closer or further away from the UEs). Subsequently the measurements of the reference signals by the two UEs in the pair can be compared for the same transmission power (i.e. the same beam).

In some embodiments, the beamforming operation is repeated for multiple measurement patterns/trajectories. For example, the measurement plan shown in FIGS. 5(a) and (b) could be repeated for concentric circles with different radii.

For every measurement point, each UE measures and reports one or more signal strength and/or signal quality measurements to the radio network node 401. The measurements are passed to the control node 301.

Where each UE 402 reports multiple measurements of the beam at a particular measurement point, the control node 301 can compute a function (e.g. an average or weighted average) of those measurements to get a less noise-prone measurement of the signal strength and/or quality for a given UE 402. Where a function of multiple measurements is determined, the resulting measurements (e.g. averaged or weighted-averaged measurements) are used in the subsequent parts of the method.

Assuming that there are N measurement points, at the end of the process the control node 301 will have N reference signal measurements (e.g. N averaged reference signal measurements) for each UE 402. Next in the closeness audit algorithm of step 340, the control node 301 determines if the UEs 402 meet the location criterion for closeness based on the obtained reference signal measurements.

In some embodiments, the control node 301 can determine a correlation between the reference signal measurements for the UEs 402. That is, the measurements of the reference signal beam at each measurement point (e.g. p1-p12) by UE1 and UE3 can be compared to each other. The correlation strength gives an indication of how close the UEs 402 are to each other. In other words, the higher the correlation of the two sets of reference signal measurements by the two UEs 402, the closer the UEs are to each other, and vice versa.

The location criterion for closeness can be defined with reference to the correlation measure. In some embodiments, a pair of UEs can be considered to meet the location criterion for closeness (i.e. are found to be co-located) if a measure of correlation (e.g. a correlation coefficient) for their respective reference signal measurements is above a first threshold value. The first threshold value effectively defines a distance threshold between the UEs 402, and therefore the first threshold value can be set based on the purpose for which the location criterion is to be used. For example, if the location criterion is being evaluated for the purposes of determining if the UEs can use P2P communication, the first threshold value can be set based on the typical distances over which the P2P communication can be used. In this case, the first threshold value may be higher for P2P communications that are to use Bluetooth than for P2P communications that are to use WiFi Direct or a cellular communication standard, since Bluetooth has a shorter effective range.

It has also been found that the amplitude of deviation of values in the N reference signal measurements for a UE 402 is proportional to the distance of the UE from the centre of the spatial distribution of measurement points. Therefore, the amplitude of deviation of values can be used as an indication of the distance between the UEs 402. The deviation of values for a UE 402, the control node 301 can be expressed by a so-called "max2min ratio" which is a ratio between maximum and minimum measurement values among the N reference signal measurements for that UE 402. The max2min ratio can be determined for both UEs in the pair. The location criterion for closeness can be defined with reference to a comparison of the max2min ratios for the two UEs 402. In some embodiments, a pair of UEs can be considered to meet the location criterion for closeness (i.e. are found to be co-located) if the max2min ratio for one of the UEs in the pair differs from max2min ratio for the other UE by less than a second threshold value. The second threshold value effectively defines a distance threshold between the UEs 402, and therefore the second threshold value can be set based on the purpose for which the location criterion is to be used. For example, if the location criterion is being evaluated for the purposes of determining if the UEs can use P2P communication, the second threshold value can be set based on the typical distances over which the P2P communication can be used. In this case, the second threshold value may be lower for P2P communications that are to use Bluetooth than for P2P communications that are to use WiFi Direct or a cellular communication standard, since Bluetooth has a shorter effective range.

In some embodiments, the control node 301 can evaluate both a correlation measure and max2min ratios for the UEs to determine if the UEs 402 meet the location criterion for closeness. Thus, a pair of UEs can be considered to meet a location criterion for closeness and be found to be co-located if the correlation measure/coefficient is above a first threshold value and the difference between the max2min ratios for the pair of UEs is below a second threshold value.

In embodiments where multiple pairs of possibly closely spaced UEs are identified in step 320, the closeness audit algorithm of step 340 can be performed for each pair of UEs to determine which, if any, of the pairs of UEs meet the location criterion for closeness.

In some embodiments, once the algorithm has evaluated multiple, or all, UE pairs in the UE group, basic logic (i.e. reasoning or a transitive law) can be applied to assess if the location criterion for closeness is met for all the UEs in the group with each other. For example, if UE A and B are found in step 340 to meet the location criterion and UE B and C are found in step 340 to meet the location criterion, then A can be considered to meet the location criterion with C. In other words, if UE A and B are found to be co-located and UE B and C are found to be co-located, then A is also considered to be co-located with C.

As an example, consider a UE group of 4 UEs: A, B, C, D, where the pairing selection step 320 has found that at least one member of a pair overlaps with exactly one member of another pair, until all UEs exist in at least one pair. For example, pair selection in step 320 could yield pairs (A,B), (B,C) and (C,D); or (A,D), (A,B) and (B,C). Considering the first three: (A,B), (B,C) and (C,D), the application of a transitive law can be used to indirectly infer co-location of UEs. A transitive law dictates that given a relation R and relatable entities x, y, z, if it is known that x R y and y R z, then x R z. Thus, if UE A is found to be co-located with UE B, and UE B is found to be co-located with UE C, then by transitive law, A is considered to be co-located with C. Similarly, if UE C is found to be co-located with D, by transitive law, A is considered to be co-located with D, and D is considered to be co-located with B. Therefore, every UE in the group is considered to be co-located with every other UE.

After step 340, if a pair, or at least one pair, of UEs 402 has been found to meet the location criterion for closeness, the control node 301 can perform a suitable action related to the evaluation of the location criterion in step 350. For example, if the location criterion was evaluated for the purpose of determining if P2P communications could be established between the UEs 402, the control node 301 can perform an appropriate action to initiate a P2P session between the UEs 402. For example, the control node 301 may then indicate to the radio network node 401, for example the baseband circuitry 303 in the radio network node 401, that the relevant UEs 402 are close enough to use P2P communications between them. In response to the indication, the baseband circuitry 303 can send a signal or command to one or both of the UEs 402 to indicate that a P2P communication link can, or should, be established. Alternatively, and particularly in embodiments where the control node 301 is part of the radio network node 401, the control node 301 can directly initiate the sending of a signal or command to one or both of the UEs 402 to indicate that a P2P communication link should be established.

Figure 7:
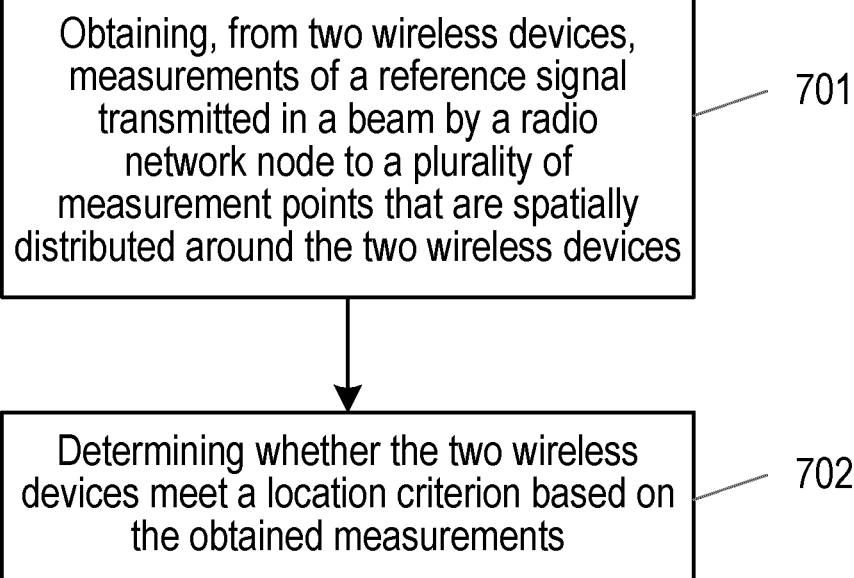
FIG. 7 is a flow chart illustrating a method of operating a control node according to various embodiments.

FIG. 7 is a flow chart illustrating a method performed by a control node according to various embodiments. The method comprises step 701 of obtaining, from two wireless devices, measurements of a reference signal transmitted in a beam by a radio network node to a plurality of measurement points that are spatially distributed around the two wireless devices. In some embodiments, step 701 comprises receiving a plurality of reference signal measurements from each wireless device for each measurement point.

The method shown in FIG. 7 further comprises step 702 of determining whether the two wireless devices meet a location criterion based on the obtained measurements. In some embodiments, step 702 comprises computing a function of the received measurements for each wireless device at each measurement point and determining whether the two wireless devices meet the location criterion based on the function of the received measurements. The location criterion for closeness can be a location criterion for using P2P communication.

In some embodiments, step 702 further comprises determining a measure of a correlation between the measurements from one of the two wireless devices for the plurality of measurement points and the measurements from the other one of the two wireless devices for the plurality of measurement points. In some of these embodiments, the location criterion is met if the correlation measure is above a first threshold value.

In some embodiments, step 702 comprises determining an indication of distance between one of the two wireless devices and a point at the centre of the plurality of measurement points, and an indication of distance between the other one of the two wireless devices and the point at the centre of the plurality of measurement points. The indications of the distances are based on the respective measurements of the reference signal and can, in some of these embodiments, be determined as a ratio of a maximum measurement of the reference signal obtained from the wireless device and a minimum measurement of the reference signal obtained from the wireless device. In some embodiments, the location criterion is met if a difference between the indications of the distances is below a second threshold value. In alternative embodiments, the location criterion is met if the correlation measure is above a first threshold value and a difference between the indications of the distances is below a second threshold value.

In some embodiments, if it is determined that the two wireless devices meet the location criterion, the method further comprises indicating to the radio network node that P2P communication can be used by the two wireless devices.

In some embodiments, the method depicted in FIG. 7 further comprises initiating the transmission of the reference signal in the beam by the radio network node. The beam can be an existing beam transmitted by the radio network node that is serving at least one of the wireless devices. Alternatively, the beam can be an additional beam to an existing beam transmitted by the radio network node that is serving at least one of the wireless devices.

In some embodiments, the transmission power of the beam is adjusted for each measurement point. The transmission power can be adjusted based on reference signal measurement feedback from the two wireless devices.

In some embodiments, the plurality of measurement points are spatially distributed around a series of predicted positions of the two wireless devices. The series of predicted positions of the two wireless devices can be based on speed and direction of movement of the two wireless devices.

In some embodiments, the two wireless devices are initially identified based on at least one of: beam direction from the radio network node, transmission power from the radio network node and measurements of reference signals from the radio network node by the two wireless devices.

In some embodiments, the method depicted in FIG. 7 further comprises repeating the steps of obtaining 701 measurements and determining 702 whether the location criterion is met for a third wireless device and one of the two wireless devices. If it is determined that the two wireless devices meet the location criterion, and the third wireless device and one of the two wireless devices meet the location criterion, then the control node can further determine that the third wireless devices and the other one of the two wireless devices also meet the location criterion.

Figure 8:
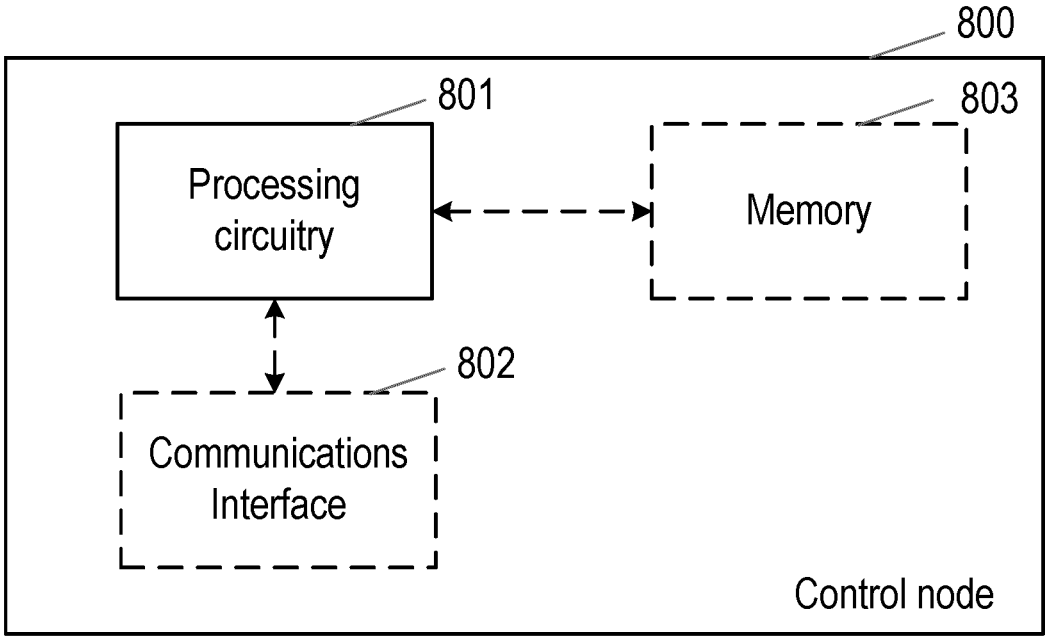
FIG. 8 is a block diagram of a control node according to various embodiments.

FIG. 8 is a simplified block diagram of a control node 800 according to various embodiments that can be used to implement the techniques described herein. It will be appreciated that the control node 800 may comprise one or more virtual machines running different software and/or processes. The control node 800 may therefore comprise one or more servers, switches and/or storage devices and/or may comprise cloud computing infrastructure that runs the software and/or processes. As noted above, the control node 700 may alternatively be part of a radio network node, such as part of an antenna controller and/or baseband circuitry.

The processing circuitry 801 controls the operation of the control node 800 and can implement the methods described herein in relation to the control node 800. The processing circuitry 801 can comprise one or more processors, processing units, multi-core processors or modules that are configured or programmed to control the control node 800 in the manner described herein. In particular implementations, the processing circuitry 801 can comprise a plurality of software and/or hardware modules that are each configured to perform, or are for performing, individual or multiple steps of the method described herein in relation to the control node 800.

In some embodiments, the control node 800 may optionally comprise a communications interface 802. The communications interface 802 can be for use in communicating with other nodes, such as other virtual nodes. For example, the communications interface 802 can be configured to transmit to and/or receive from other nodes or network functions requests, resources, information, data, signals, or similar. The processing circuitry 801 may be configured to control the communications interface 802 of the control node 800 to transmit to and/or receive from other nodes or network functions requests, resources, information, data, signals, or similar.

Optionally, the control node 800 may comprise a memory 803. In some embodiments, the memory 803 can be configured to store program code that can be executed by the processing circuitry 801 to perform the method described herein in relation to the control node 800. Alternatively or in addition, the memory 803 can be configured to store any requests, resources, information, data, signals, or similar that are described herein. The processing circuitry 801 may be configured to control the memory 803 to store any requests, resources, information, data, signals, or similar that are described herein.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method performed by a control node for determining whether two wireless devices meet a location criterion for closeness, the method comprising:
obtaining, from each of the two wireless devices, measurements of a reference signal transmitted by a radio network node in each of a plurality of beam-formed signals directed towards a respective plurality of measurement points that are spatially distributed around the two wireless devices; and
determining whether the two wireless devices meet the location criterion based on the obtained measurements.

2. The method of claim 1, wherein:
the step of obtaining measurements comprises receiving a plurality of reference signal measurements from each wireless device for each measurement point; and
the step of determining comprises computing a function of the received measurements for each wireless device at each measurement point and determining whether the two wireless devices meet the location criterion based on the function of the received measurements.

3. The method of claim 1, wherein the location criterion for closeness is a location criterion for using peer-to-peer (P2P) communication.

4. The method of claim 1, wherein the method further comprises:
initiating the transmission of the plurality of beam-formed signals by the radio network node.

5. The method of claim 1, wherein the step of determining whether the two wireless devices meet the location criterion comprises:
determining a measure of a correlation between the measurements from one of the two wireless devices for the plurality of measurement points and the measurements from the other one of the two wireless devices for the plurality of measurement points.

6. The method of claim 5, wherein the location criterion is met if the correlation measure is above a first threshold value.

7. The method of claim 1, wherein the step of determining whether the two wireless devices meet the location criterion comprises:
determining an indication of distance between one of the two wireless devices and a point at the center of the plurality of measurement points, and an indication of distance between the other one of the two wireless devices and the point at the center of the plurality of measurement points, wherein the indications of the distances are based on the respective measurements of the reference signal, wherein the location criterion is met if a difference between the indications of the distances is below a second threshold value.

8. The method of claim 7, wherein the indication of the distance between a wireless device and the point at the center of the plurality of measurement points is determined as a ratio of a maximum measurement of the reference signal obtained from the wireless device and a minimum measurement of the reference signal obtained from the wireless device.

9. The method of claim 1, wherein the method further comprises:
if it is determined that the two wireless devices meet the location criterion, indicating to the radio network node that peer-to-peer (P2P) communication can be used by the two wireless devices.

10. The method of claim 1, wherein the two wireless devices are identified based on at least one of: beam direction from the radio network node, transmission power from the radio network node and measurements of reference signals from the radio network node by the two wireless devices.

11. The method of claim 1, wherein the method further comprises repeating the steps of obtaining measurements and determining whether the location criterion is met for a third wireless device and one of the two wireless devices.

12. The method of claim 11, wherein if it is determined that the two wireless devices meet the location criterion, and if it is determined that the third wireless device and said one of the two wireless devices meet the location criterion, determining that the third wireless devices and the other one of the two wireless devices also meet the location criterion.

13. A control node for determining whether two wireless devices meet a location criterion for closeness, the control node comprising processing circuitry and memory operatively coupled to the processing circuitry, the memory comprising instructions executable by the processing circuitry whereby the control node is configured to:

obtain, from each of the two wireless devices, measurements of a reference signal transmitted by a radio network node in each of a plurality of beam-formed signals directed towards a respective plurality of measurement points that are spatially distributed around the two wireless devices; and determine whether the two wireless devices meet the location criterion based on the obtained measurements.

14. The control node of claim 13, wherein the control node is further configured to:

obtain the measurements by receiving a plurality of reference signal measurements from each wireless device for each measurement point; and determine whether the two wireless devices meet the location criterion by computing a function of the received measurements for each wireless device at each measurement point and determining whether the two wireless devices meet the location criterion based on the function of the received measurements.

15. The control node of claim 13, wherein the control node is further configured to:

initiate the transmission of the plurality of beam-formed signals by the radio network node.

16. The control node of claim 13, wherein the control node is further configured to determine whether the two wireless devices meet the location criterion by determining a measure of a correlation between the measurements from one of the two wireless devices for the plurality of measurement points and the measurements from the other one of the two wireless devices for the plurality of measurement points.

17. The control node of claim 13, wherein the control node is further configured to determine whether the two wireless devices meet the location criterion by determining an indication of distance between one of the two wireless devices and a point at the center of the plurality of measurement points, and an indication of distance between the other one of the two wireless devices and the point at the center of the plurality of measurement points, wherein the indications of the distances are based on the respective measurements of the reference signal, wherein the location criterion is met if a difference between the indications of the distances is below a second threshold value.

18. The control node of claim 17, wherein the indication of the distance between a wireless device and the point at the center of the plurality of measurement points is determined as a ratio of a maximum measurement of the reference signal obtained from the wireless device and a minimum measurement of the reference signal obtained from the wireless device.

19. The control node of claim 13, wherein the control node is further configured to:

if it is determined that the two wireless devices meet the location criterion, indicate to the radio network node that peer-to-peer (P2P) communication can be used by the two wireless devices.

20. The control node of claim 13, wherein the control node is further configured to:

obtain, from a third wireless device and one of the two wireless devices, measurements of a reference signal transmitted by a radio network node in each of a plurality of beam-formed signals directed towards a respective plurality of measurement points that are spatially distributed around the third wireless device and said one of the two wireless devices; and determine whether the third wireless device and said one of the two wireless devices meet the location criterion based on the obtained measurements.

* * * * *